United States Patent

Haba et al.

(10) Patent No.: US 9,765,197 B2
(45) Date of Patent: Sep. 19, 2017

(54) RUBBER COMPOSITION AND PNEUMATIC TIRE HAVING TREAD MANUFACTURED FROM SAID RUBBER COMPOSITION

(71) Applicant: SUMITOMO RUBBER INDUSTRIES, LTD., Kobe-shi, Hyogo (JP)

(72) Inventors: Toshifumi Haba, Kobe (JP); Kenya Watanabe, Kobe (JP); Takahiro Mabuchi, Kobe (JP); Daiko Fujimori, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 210 days.

(21) Appl. No.: 14/721,167

(22) Filed: May 26, 2015

(65) Prior Publication Data

US 2015/0368426 A1    Dec. 24, 2015

(30) Foreign Application Priority Data

Jun. 23, 2014 (JP) ................. 2014-128352
Dec. 11, 2014 (JP) ................. 2014-250994

(51) Int. Cl.
| | |
|---|---|
| C08F 20/10 | (2006.01) |
| C08K 3/36 | (2006.01) |
| C08K 3/04 | (2006.01) |
| C08F 20/14 | (2006.01) |
| C08F 36/04 | (2006.01) |
| C08F 36/06 | (2006.01) |
| C08F 36/08 | (2006.01) |
| C08F 20/12 | (2006.01) |
| B60C 1/00 | (2006.01) |
| C08F 236/06 | (2006.01) |
| C08F 236/10 | (2006.01) |
| C08K 5/36 | (2006.01) |
| C08K 5/548 | (2006.01) |

(52) U.S. Cl.
CPC ............. *C08K 3/36* (2013.01); *B60C 1/0016* (2013.01); *C08F 20/10* (2013.01); *C08F 20/12* (2013.01); *C08F 20/14* (2013.01); *C08F 36/04* (2013.01); *C08F 36/06* (2013.01); *C08F 36/08* (2013.01); *C08F 236/06* (2013.01); *C08F 236/10* (2013.01); *C08K 3/04* (2013.01); *B60C 1/0025* (2013.01); *C08K 5/36* (2013.01); *C08K 5/548* (2013.01); *C08K 2003/045* (2013.01)

(58) Field of Classification Search
CPC .......... C08F 36/06; C08F 36/08; C08F 36/04; C08F 20/14; C08F 20/12; C08F 20/10
See application file for complete search history.

(56) References Cited

U.S. PATENT DOCUMENTS

| | | | | |
|---|---|---|---|---|
| 5,753,722 | A * | 5/1998 | Itokawa | C08G 59/1494 430/280.1 |
| 6,562,929 | B2 * | 5/2003 | Konno | C08F 236/12 524/552 |
| 2011/0098404 | A1 | 4/2011 | Kwag et al. | |
| 2012/0164363 | A1 | 6/2012 | Kwag et al. | |

FOREIGN PATENT DOCUMENTS

| | | |
|---|---|---|
| JP | 2013-53296 A | 3/2013 |
| KR | 20110060588 A | 6/2011 |

OTHER PUBLICATIONS

Database WPI, AN 2011-H58122, XP002746597.

* cited by examiner

*Primary Examiner* — Peter D Mulcahy
(74) *Attorney, Agent, or Firm* — Birch, Stewart, Kolasch & Birch, LLP

(57) ABSTRACT

Provided are a rubber composition having a good balance of improved fuel efficiency, abrasion resistance, and wet grip performance while providing good processability, and a pneumatic tire having a tread manufactured from the rubber composition. A rubber composition comprising: a copolymer synthesized by copolymerization of a conjugated diene monomer and an unsaturated acyclic monoester represented by the formula (1) below; and carbon black and/or silica,

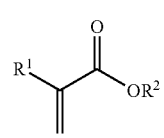

(1)

wherein $R^1$ represents hydrogen or a C1-C30 hydrocarbon group, and $R^2$ represents hydrogen or a C1-C30 hydrocarbon group.

8 Claims, No Drawings

RUBBER COMPOSITION AND PNEUMATIC TIRE HAVING TREAD MANUFACTURED FROM SAID RUBBER COMPOSITION

TECHNICAL FIELD

The present invention relates to a rubber composition and a pneumatic tire having a tread manufactured from the rubber composition.

BACKGROUND ART

Tire treads need to be provided with high levels of mainly fuel efficiency, abrasion resistance, wet grip performance and other properties, and various methods for improving these properties have been considered.

For example, fuel efficiency is known to be improved by introducing a functional group having an affinity for filler into the polymer end; abrasion resistance is known to be improved by use of a high molecular weight polymer having a molecular weight of 250,000 or more; and wet grip performance is known to be improved by use of a polymer having a high glass transition temperature (Tg).

However, the introduction of a functional group having an affinity for filler, the use of a high molecular weight polymer, and the use of a polymer having a high Tg resulting from increased styrene content all result in rubber compositions having increased hardness and therefore poor processability.

Patent Literature 1 discloses a tire rubber composition of which the fuel efficiency, the abrasion resistance, and the wet grip performance are improved by adding a liquid resin having a softening point of −20 to 45° C. and a certain silica. However, there is still room for improvement in terms of achieving balanced improvements in these properties while providing good processability.

CITATION LIST

Patent Literature

Patent Literature 1: JP 2013-053296 A

SUMMARY OF INVENTION

Technical Problem

The present invention aims to solve the problem and provide a rubber composition having a good balance of improved fuel efficiency, abrasion resistance, and wet grip performance while providing good processability, as well as a pneumatic tire having a tread manufactured from the rubber composition.

Solution to Problem

The present invention relates to a rubber composition, comprising: a copolymer synthesized by copolymerization of a conjugated diene monomer and an unsaturated acyclic monoester represented by the formula (1) below; and at least one of carbon black and silica,

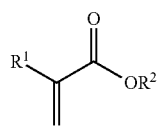

(1)

wherein $R^1$ represents hydrogen or a C1-C30 hydrocarbon group, and $R^2$ represents hydrogen or a C1-C30 hydrocarbon group.

The copolymer preferably comprises 5% to 95% by mass of units derived from the conjugated diene monomer and 5% to 95% by mass of units derived from the unsaturated acyclic monoester per 100% by mass of structural units of the copolymer.

Preferably, the copolymer is synthesized by emulsion polymerization, and has a weight average molecular weight within the range of 5,000 to 2,000,000 and a molecular weight distribution within the range of 2.1 to 11.

Preferably, $R^1$ is hydrogen or methyl, and $R^2$ is methyl.

The conjugated diene monomer is preferably 1,3-butadiene.

Preferably, the copolymer is synthesized by emulsion polymerization of an additional compound represented by the formula (2) below, and comprises 1% to 50% by mass of units derived from this comonomer per 100% by mass of structural units of the copolymer,

(2)

wherein $R^{21}$ represents hydrogen, a C1-C3 aliphatic hydrocarbon group, a C3-C8 alicyclic hydrocarbon group, or a C6-C10 aromatic hydrocarbon group, and $R^{22}$ represents hydrogen or methyl.

The copolymer is preferably synthesized using as a chain transfer agent a compound that contains a mercapto group and a functional group having an affinity for filler.

The present invention also relates to a pneumatic tire, having a tread manufactured from the rubber composition.

Advantageous Effects of Invention

Since the present invention provides a rubber composition that contains: a copolymer synthesized by copolymerization of a conjugated diene monomer and an unsaturated acyclic monoester represented by the formula (1); and carbon black and/or silica, balanced improvements in fuel efficiency, abrasion resistance, and wet grip performance can be achieved while providing good processability.

DESCRIPTION OF EMBODIMENTS

The rubber composition of the present invention contains a copolymer synthesized by copolymerization of a conjugated diene monomer and an unsaturated acyclic monoester represented by the formula (1), and carbon black and/or silica. When a copolymer formed by copolymerizing not only a conjugated diene monomer but also an unsaturated acyclic monoester represented by the formula (1) as monomers is used with carbon black or silica, balanced improvements in fuel efficiency, abrasion resistance, and wet grip performance can be achieved while providing good processability to the unvulcanized rubber composition; therefore, the rubber composition provided by the present invention is excellent in the balance of these properties.

The copolymer has a monomer unit derived from a conjugated diene monomer as a structural unit. The conjugated diene monomer preferably has 4 to 8 carbon atoms, and examples include 1,3-butadiene, isoprene, and 2,3- dimethyl-1,3-butadiene. Particularly in view of fuel efficiency, abrasion resistance, and wet grip performance, 1,3-butadiene and isoprene are preferred, with 1,3-butadiene being more preferred. These monomers may be used alone, or two or more of these may be used in combination.

In the copolymer, the amount of units derived from the conjugated diene monomer, per 100% by mass of the structural units in the copolymer, is preferably 5% by mass or more, more preferably 30% by mass or more, still more preferably 50% by mass or more, and particularly preferably 60% by mass or more, while the amount is preferably 95% by mass or less, more preferably 90% by mass or less, and still more preferably 80% by mass or less. If the amount is less than 5% by mass, abrasion resistance may be reduced. If the amount is more than 95% by mass, fuel efficiency may be reduced.

The copolymer has a monomer unit derived from an unsaturated acyclic monoester represented by the formula (1) below as a structural unit. By the use of the copolymer having a monomer unit derived from a conjugated diene monomer, preferably a monomer unit derived from 1,3-butadiene, in combination with a monomer unit derived from an unsaturated acyclic monoester represented by the formula (1), balanced improvements in fuel efficiency, abrasion resistance, and wet grip performance can be achieved while providing good processability.

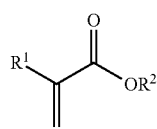

(1)

In the formula (1), $R^1$ represents hydrogen or a C1-C30 hydrocarbon group, and $R^2$ represents hydrogen or a C1-C30 hydrocarbon group.

For example, the hydrocarbon groups for $R^1$ and $R^2$ may be acyclic (e.g., linear or branched) hydrocarbon groups, preferably aliphatic hydrocarbon groups. The number of carbon atoms is preferably 1 to 20, more preferably 1 to 10, and still more preferably 1 to 3. Preferred examples are alkyl groups. The preferred number of carbon atoms for the alkyl groups is as described above. Examples of the alkyl groups include methyl, ethyl, n-propyl, isopropyl, n-butyl, isobutyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl.

$R^1$ is preferably hydrogen or a C1-C3 alkyl group, more preferably hydrogen or methyl, and still more preferably methyl. In such cases, the effects of the present invention can be better achieved.

$R^2$ is preferably a C1-C3 alkyl group, and more preferably methyl. In such cases, the effects of the present invention can be better achieved.

Specific examples of the unsaturated acyclic monoester represented by the formula (1) include methyl acrylate, methyl methacrylate, ethyl acrylate, ethyl methacrylate, butyl acrylate, butyl methacrylate, t-butyl acrylate, t-butyl methacrylate, cyclohexyl acrylate, cyclohexyl methacrylate, glycidyl acrylate, glycidyl methacrylate, tetrahydrofurfuryl acrylate, and tetrahydrofurfuryl methacrylate. Among these, methyl acrylate and methyl methacrylate are preferred, and methyl methacrylate are more preferred, because they contribute to significantly improving the balance of the following properties: fuel efficiency, abrasion resistance, and wet grip performance while providing good processability. These unsaturated acyclic monoesters may be used alone, or two or more of these may be used in combination.

In the copolymer, the amount of units derived from the unsaturated acyclic monoester represented by the formula (1), per 100% by mass of the structural units in the copolymer, is preferably 5% by mass or more, more preferably 8% by mass or more, still more preferably 10% by mass or more, and particularly preferably 20% by mass or more, while the amount is preferably 95% by mass or less, more preferably 70% by mass or less, still more preferably 50% by mass or less, and particularly preferably 40% by mass or less. If the amount is less than 5% by mass, fuel efficiency may be reduced. If the amount is more than 95% by mass, abrasion resistance may be reduced.

The copolymer may have monomer units derived from monomers other than the conjugated diene monomer and the unsaturated acyclic monoester represented by the formula (1) as structural units.

In the copolymer, the combined amount of units derived from the conjugated diene monomer and units derived from the unsaturated acyclic monoester represented by the formula (1) is preferably 60% by mass or more, more preferably 80% by mass or more, still more preferably 90% by mass or more, per 100% by mass of the structural units in the copolymer, and it may be 100% by mass. When the combined amount falls within the range mentioned above, the effects of the present invention can be better achieved.

The copolymer preferably has a monomer unit derived from a compound represented by the formula (2) below as a structural unit. If the copolymer contains the monomer unit derived from a compound represented by the formula (2), preferably styrene, in addition to the above-described structural units, wet grip performance and abrasion resistance, and particularly wet grip performance can be more significantly improved and thus the balance of the following properties: fuel efficiency, abrasion resistance, and wet grip performance can be more significantly improved while providing good processability.

(2)

In the formula (2), $R^{21}$ represents hydrogen, a C1-C3 aliphatic hydrocarbon group, a C3-C8 alicyclic hydrocarbon group, or a C6-C10 aromatic hydrocarbon group, and $R^{22}$ represents hydrogen or methyl.

For example, the C1-C3 aliphatic hydrocarbon group in the compound represented by the formula (2) may be a C1-C3 alkyl group, such as methyl, ethyl, n-propyl, or isopropyl. Preferred among these is methyl.

Examples of the C3-C8 alicyclic hydrocarbon group of the compound represented by the formula (2) include cyclopropyl, cyclobutyl, cyclopentyl, cyclohexyl, cycloheptyl, cyclooctyl, cyclopropenyl, cyclobutenyl, cyclopentenyl, cyclohexenyl, cycloheptenyl, and cyclooctenyl.

Examples of the C6-C10 aromatic hydrocarbon group of the compound represented by the formula (2) include phenyl, benzyl, phenethyl, tolyl, xylyl, and naphthyl. Particularly in view of high reactivity, phenyl, tolyl, and naphthyl are preferred, and phenyl is more preferred.

$R^{21}$ is preferably a C6-C10 aromatic hydrocarbon group. $R^{22}$ is preferably hydrogen.

Examples of the compound represented by the formula (2) include styrene, 2-methylstyrene, 3-methylstyrene, 4-methylstyrene, α-methylstyrene, 2,4-dimethylstyrene, vinylethylbenzene, α-vinylnaphthalene, β-vinylnaphthalene, and vinylxylene. Particularly in view of high reactivity, styrene, α-methylstyrene, α-vinylnaphthalene, and β-vinylnaphthalene are preferred, and styrene is more preferred.

In the copolymer, the amount of units derived from the compound represented by the formula (2), per 100% by mass of the structural units in the copolymer, is preferably 1% by mass or more, more preferably 5% by mass or more, and still more preferably 10% by mass or more, while the amount is preferably 50% by mass or less, more preferably 30% by mass or less, and still more preferably 20% by mass or less. When the amount thereof falls within the range mentioned above, the effects of the present invention can be sufficiently achieved.

In the copolymer, the combined amount of units derived from the unsaturated acyclic monoester represented by the formula (1) and units derived from the compound represented by the formula (2) is preferably 5% by mass or more, more preferably 8% by mass or more, still more preferably 10% by mass or more, particularly preferably 15% by mass or more, per 100% by mass of the structural units in the copolymer. The combined amount thereof is also preferably 95% by mass or less, more preferably 70% by mass or less, still more preferably 50% by mass or less, particularly preferably 40% by mass or less, most preferably 30% by mass or less, per 100% by mass of the structural units in the copolymer. When the combined amount falls within the range mentioned above, the effects of the present invention can be sufficiently achieved.

In the copolymer, the amounts of the monomer units, including those derived from the conjugated diene monomer and the unsaturated acyclic monoester represented by the formula (1), can be measured by NMR (available from Bruker).

The copolymer may be produced by any copolymerization method, such as solution polymerization, emulsion polymerization, gas phase polymerization, or bulk polymerization. Preferred is emulsion polymerization because it produces a high yield of the copolymer with a high degree of monomer randomness.

In the case of emulsion polymerization, the copolymer can be synthesized by known emulsion polymerization methods. For example, the copolymer can be more suitably produced by a method including the steps of: emulsifying the copolymer forming monomers, i.e., the diene monomer and the unsaturated acyclic monoester represented by the formula (1), and optionally the compound represented by the formula (2) in water using an emulsifier; and adding a free radical initiator to the resulting emulsion to cause free radical polymerization.

The emulsion can be prepared by known emulsification methods using an emulsifier. The emulsifier is not particularly limited, and may be any one of known materials, such as fatty acid salts and rosin acid salts. Examples of the fatty acid salts and rosin acid salts include potassium or sodium salts of capric acid, lauric acid, myristic acid, and the like.

The emulsion polymerization can be carried out by known methods using a free radical polymerization initiator.

The free radical polymerization initiator is not particularly limited, and may be any one of known materials. Examples include redox initiators such as paramenthane hydroperoxide, and persulfates such as ammonium persulfate.

The temperature of emulsion polymerization may be appropriately adjusted according to the type of free radical initiator used, and it preferably ranges from −30 to 50° C. and more preferably from −10 to 20° C.

The emulsion polymerization can be stopped by adding a polymerization terminator to the polymerization system. The polymerization terminator is not particularly limited, and may be any one of known materials, such as N,N'-dimethyldithiocarbamate, diethylhydroxylamine, and hydroquinone.

The copolymer in the present invention is preferably produced by emulsion polymerization in the presence of a chain transfer agent. The thus produced copolymer further improves processability, fuel efficiency, and abrasion resistance.

The chain transfer agent refers to an agent for controlling free radical polymerization which can act on the growing polymer end to terminate the polymer growth while generating a new polymerization-initiating radical. This agent enables the polymer to have a controlled molecular weight and a controlled molecular weight distribution (lower molecular weight and narrower molecular weight distribution), and also to have a controlled polymer end structure and the like.

Examples of the chain transfer agents include mercapto group-containing compounds such as n-octyl mercaptan, n-nonyl mercaptan, n-decyl mercaptan, n-dodecyl mercaptan, t-dodecyl mercaptan, and n-hexadecyl mercaptan. Preferred among these is t-dodecyl mercaptan because it can easily control molecular weight.

Further, the chain transfer agent may suitably be a compound that contains a mercapto group and a functional group having an affinity for filler. If a compound that contains a combination of a mercapto group with a functional group having an affinity for filler is used as the chain transfer agent, then the functional group having an affinity for filler can be introduced into the polymer end, thereby resulting in more significantly improved fuel efficiency, wet grip performance, and abrasion resistance. Examples of the functional groups having an affinity for filler include amino, amide, alkoxysilyl, isocyanate, imino, imidazole, urea, ester, ether, carbonyl, carboxyl, hydroxyl, nitrile, and pyridyl groups. Preferred among these are alkoxysilyl and ester groups, with alkoxysilyl groups being more preferred. The filler as used herein means reinforcing fillers such as carbon black and silica.

Suitable examples of the compound containing an ester group include methyl 3-mercaptopropionate, ethyl 3-mercaptopropionate, propyl 3-mercaptopropionate, butyl 3-mercaptopropionate, pentyl 3-mercaptopropionate, hexyl 3-mercaptopropionate, heptyl 3-mercaptopropionate, octyl 3-mercaptopropionate, 2-ethylhexyl 3-mercaptopropionate, 2-ethylhexyl mercaptoethanoate, 2-mercaptoethyl methanoate, 2-mercaptoethyl ethanoate, 2-mercaptoethyl propionate, 2-mercaptoethyl butanoate, 2-mercaptoethyl pentanoate, 2-mercaptoethyl hexanoate, 2-mercaptoethyl heptanoate, 2-mercaptoethyl octanoate, and 2-mercaptomethyl octanoate. Preferred among these are 2-ethylhexyl 3-mercaptopropionate and 2-mercaptoethyl octanoate.

The compound containing an alkoxysilyl group may suitably be a compound represented by the formula (3) below. In such a case, fuel efficiency, wet grip performance, and abrasion resistance can be more significantly improved.

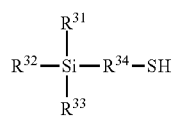

(3)

In the formula (3), each of $R^{31}$ to $R^{33}$ represents a branched or unbranched C1-C12 alkyl group, a branched or unbranched C1-C12 alkoxy group, or a group represented by —O—$(R^{35}$—O$)_z$—$R^{36}$ in which each of z $R^{35}$s represents a branched or unbranched C1-C30 divalent hydrocarbon group, and z $R^{35}$s may be the same as or different from one another; $R^{36}$ represents a branched or unbranched C1-C30 alkyl group, a branched or unbranched C2-C30 alkenyl group, a C6-C30 aryl group, or a C7-C30 aralkyl group; and z represents an integer of 1 to 30, provided that at least one of $R^{31}$ to $R^{33}$ is a branched or unbranched C1-C12 alkoxy group, and $R^{31}$ to $R^{33}$ may be the same as or different from one another; and $R^{34}$ represents a branched or unbranched C1-C6 alkylene group.

Each of $R^{31}$ to $R^{33}$ represents a branched or unbranched C1-C12 alkyl group, a branched or unbranched C1-C12 alkoxy group, or a group represented by —O—$(R^{35}$—O$)_z$—$R^{36}$, provided that at least one of $R^{31}$ to $R^{33}$ is a branched or unbranched C1-C12 alkoxy group.

Further, an additional at least one of $R^{31}$ to $R^{33}$ is preferably a group represented by —O—$(R^{35}$—O$)_z$—$R^{36}$, and both the remaining two groups are more preferably groups represented by —O—$(R^{35}$—O$)_z$—$R^{36}$, because the effects of the present invention can be better achieved.

Also, all the $R^{31}$ to $R^{33}$ are preferably branched or unbranched C1-C12, preferably C1-C5, more preferably C1-C3 alkoxy groups.

Examples of the branched or unbranched C1-C12 (preferably C1-C5) alkyl groups for $R^{31}$ to $R^{33}$ include methyl, ethyl, n-propyl, isopropyl, n-butyl, iso-butyl, sec-butyl, tert-butyl, pentyl, hexyl, heptyl, 2-ethylhexyl, octyl, and nonyl.

Examples of the branched or unbranched C1-C12 (preferably C1-C5, more preferably C1-C3) alkoxy groups for $R^{31}$ to $R^{33}$ include methoxy, ethoxy, n-propoxy, isopropoxy, n-butoxy, iso-butoxy, sec-butoxy, tert-butoxy, pentyloxy, hexyloxy, heptyloxy, 2-ethylhexyloxy, octyloxy, and nonyloxy.

In the group —O—$(R^{35}$—O$)_z$—$R^{36}$ for $R^{31}$ to $R^{33}$, $R^{35}$ represents a branched or unbranched C1-C30, preferably C1-C15, more preferably C1-C3 divalent hydrocarbon group.

For example, the hydrocarbon group may be a branched or unbranched C1-C30 alkylene group, a branched or unbranched C2-C30 alkenylene group, a branched or unbranched C2-C30 alkynylene group, or a C6-C30 arylene group. In particular, it is preferably a branched or unbranched C1-C30 alkylene group.

Examples of the branched or unbranched C1-C30 (preferably C1-C15, more preferably C1-C3) alkylene groups for $R^{35}$ include methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, and octadecylene.

Examples of the branched or unbranched C2-C30 (preferably C2-C15, more preferably C2-C3) alkenylene groups for $R^{35}$ include vinylene, 1-propenylene, 2-propenylene, 1-butenylene, 2-butenylene, 1-pentenylene, 2-pentenylene, 1-hexenylene, 2-hexenylene, and 1-octenylene.

Examples of the branched or unbranched C2-C30 (preferably C2-C15, more preferably C2-C3) alkynylene groups for $R^{35}$ include ethynylene, propynylene, butynylene, pentynylene, hexynylene, heptynylene, octynylene, nonynylene, decynylene, undecynylene, and dodecynylene.

Examples of the C6-C30 (preferably C6-C15) arylene groups for $R^{35}$ include phenylene, tolylene, xylylene, and naphthylene.

The symbol z represents an integer of 1 to 30, preferably 2 to 20, more preferably 3 to 7, and still more preferably 5 to 6.

$R^{36}$ represents a branched or unbranched C1-C30 alkyl group, a branched or unbranched C2-C30 alkenyl group, a C6-C30 aryl group, or a C7-C30 aralkyl group. In particular, it is preferably a branched or unbranched C1-C30 alkyl group.

Examples of the branched or unbranched C1-C30 (preferably C3-C25, more preferably C10-C15) alkyl groups for $R^{36}$ include methyl, ethyl, n-propyl, isopropyl, n-butyl, isobutyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl.

Examples of the branched or unbranched. C2-C30 (preferably C3-C25, more preferably C10-C15) alkenyl groups for $R^{36}$ include vinyl, 1-propenyl, 2-propenyl, 1-butenyl, 2-butenyl, 1-pentenyl, 2-pentenyl, 1-hexenyl, 2-hexenyl, 1-octenyl, decenyl, undecenyl, dodecenyl, tridecenyl, tetradecenyl, pentadecenyl, and octadecenyl.

Examples of the C6-C30 (preferably C10-C20) aryl groups for $R^{36}$ include phenyl, tolyl, xylyl, naphthyl, and biphenyl.

Examples of the C7-C30 (preferably C10-C20) aralkyl groups for $R^{36}$ include benzyl and phenethyl.

Specific examples of the group represented by —O—$(R^{35}$—O$)_z$—$R^{36}$ include —O—$(C_2H_4$—O$)_5$—$C_{11}H_{23}$, —O—$(C_2H_4$—O$)_5$—$C_{12}H_{25}$, —O—$(C_2H_4$—O$)_5$—$C_{13}H_{27}$, —O—$(C_2H_4$—O$)_5$—$C_{14}H_{29}$, —O—$(C_2H_4$—O$)_5$—$C_{15}H_{31}$, —O—$(C_2H_4$—O$)_3$—$C_{13}H_{27}$, —O—$(C_2H_4$—O$)_4$—$C_{13}H_{27}$, —O—$(C_2H_4$—O$)_6$—$C_{13}H_{27}$, and —O—$(C_2H_4$—O$)_7$—$C_{13}H_{27}$. Preferred among these are —O—$(C_2H_4$—O$)_5$—$C_{11}H_{23}$, —O—$(C_2H_4$—O$)_5$—$C_{13}H_{27}$, —O—$(C_2H_4$—O$)_5$—$C_{15}H_{31}$, and —O—$(C_2H_4$—O$)_6$—$C_{13}H_{27}$.

Examples of the branched or unbranched. C1-C6 (preferably C1-C5) alkylene groups for $R^{34}$ include the same groups as mentioned as the branched or unbranched. C1-C30 alkylene group for $R^{35}$.

Examples of the compound represented by the formula (3) include 3-mercaptopropyltrimethoxysilane, 3-mercaptopropyltriethoxysilane, 2-mercaptoethyltrimethoxysilane, 2-mercaptoethyltriethoxysilane, and a compound (Si363 produced by EVONIK-DEGUSSA) represented by the formula below. Suitable are 3-mercaptopropyltriethoxysilane and the compound represented by the formula below, more suitably the compound represented by the formula below, because the effects of the present invention can be better achieved. These compounds may be used alone, or two or more of these may be used in combination.

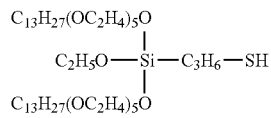

The weight average molecular weight (Mw) of the copolymer is preferably 5,000 or more, more preferably 50,000 or more, still more preferably 100,000 or more, particularly preferably 300,000 or more, and most preferably 450,000 or more. Also, the weight average molecular weight is preferably 2,000,000 or less, more preferably 1,500,000 or less, still more preferably 1,000,000 or less, and particularly preferably 700,000 or less. If the Mw is less than 5,000, fuel efficiency and abrasion resistance may be deteriorated. If the Mw is more than 2,000,000, processability may be deteriorated.

The ratio of Mw to number average molecular weight. Mn of the copolymer, that is, the molecular weight distribution (Mw/Mn) is preferably 2.1 or more, more preferably 2.5 or more, still more preferably 3.0 or more, and particularly preferably 3.8 or more. Also, the molecular weight distribution is preferably 11 or less, more preferably 8.0 or less, and still more preferably 5.0 or less. If the Mw/Mn is less than 2.1, processability may be deteriorated. If the Mw/Mn is more than 11, fuel efficiency may be deteriorated.

The Mw and Mn values are determined relative to polystyrene standards using a gel permeation chromatograph (GPC).

The glass transition temperature (Tg) of the copolymer preferably ranges from −100 to 100° C. and more preferably from −70 to 0° C. When the Tg falls within the range mentioned above, the effects of the present invention can be sufficiently achieved.

The Tg values are measured with a differential scanning calorimeter (Q200) produced by TA Instruments, Japan at a temperature increase rate of 10° C./min in accordance with JIS K 7121:1987.

The Mooney viscosity $ML_{1+4}$ at 130° C. of the copolymer preferably ranges from 30 to 100 and more preferably from 40 to 80. When the $ML_{1+4}$ falls within the range mentioned above, the effects of the present invention can be sufficiently achieved.

The Mooney viscosity ($ML_{1+4}$, 130° C.) values are determined by measuring Mooney viscosity at 130° C. in accordance with JIS K 6300.

In the rubber composition of the present invention, the amount of the copolymer based on 100% by mass of the rubber component is preferably 1% by mass or more, more preferably 50% by mass or more, still more preferably 70% by mass or more, and particularly preferably 80% by mass or more, and may be 100% by mass. If the amount is less than 1% by mass, the effects of the present invention may not be achieved due to the too low level of the copolymer.

Examples of rubber materials that can be used in addition to the copolymer in the rubber component in the present invention include diene rubbers such as natural rubber (NR), polyisoprene rubber (IR), polybutadiene rubber (BR), styrene-butadiene rubber (SBR), styrene-isoprene rubber (SIR), styrene-isoprene-butadiene rubber (SIBR), ethylene-propylene-diene rubber (EPDM), chloroprene rubber (CR), acrylonitrile-butadiene rubber (NBR), and butyl rubber (IIR). These diene rubbers may be used alone, or two or more of these may be used in combination.

The rubber composition of the present invention contains carbon black and/or silica as filler.

The carbon black used may be one generally used in the tire production, and examples include SAF, ISAF, HAF, FF, FEF, and GPF. These carbon blacks may be used alone, or two or more of these may be used in combination.

The nitrogen adsorption specific surface area ($N_2SA$) of carbon black is preferably 80 m$^2$/g or more, and more preferably 100 m$^2$/g or more. The $N_2SA$ is also preferably 200 m$^2$/g or less, and more preferably 150 m$^2$/g or less. The carbon black having a $N_2SA$ of less than 80 m$^2$/g tends to provide low reinforcing properties, failing to sufficiently improve abrasion resistance. The carbon black having a $N_2SA$ of more than 200 m$^2$/g tends to be difficult to disperse, thereby resulting in poor fuel efficiency.

The $N_2SA$ of carbon black can be measured in accordance with JIS K 6217-2:2001.

The dibutyl phthalate oil absorption (DBP) of carbon black is preferably 50 ml/100 g or more, and more preferably 100 ml/100 g or more. The DBP is also preferably 200 ml/100 g or less, and more preferably 150 ml/100 g or less. The carbon black having a DBP of less than 50 ml/100 g may provide insufficient reinforcing properties, resulting in reduced abrasion resistance. The carbon black having a DBP of more than 200 ml/100 g may have reduced dispersibility, resulting in poor fuel efficiency.

The DBP of carbon black can be measured in accordance with JIS K 6217-4:2001.

The amount of carbon black per 100 parts by mass of the rubber component is preferably 1 part by mass or more, and more preferably 3 parts by mass or more. The amount is also preferably 50 parts by mass or less, more preferably 30 parts by mass or less, and still more preferably 20 parts by mass or less. If the amount is less than 1 part by mass, abrasion resistance may be deteriorated. If the amount is more than 50 parts by mass, fuel efficiency may be deteriorated.

Examples of silica include, but are not limited to, dry silica (silicic anhydride) and wet silica (hydrated silica). Wet silica is preferred for the reason that it has a large number of silanol groups.

The $N_2SA$ of silica is preferably 100 m$^2$/g or more, and more preferably 150 m$^2$/g or more. The $N_2SA$ is also preferably 300 m$^2$/g or less, and more preferably 200 m$^2$/g or less. The silica having a $N_2SA$ of less than 100 m$^2$/g tends to provide low reinforcing properties, failing to sufficiently improve abrasion resistance. The silica having a $N_2SA$ of more than 300 m$^2$/g tends to be difficult to disperse, thereby resulting in poor fuel efficiency.

The $N_2SA$ of silica can be measured in accordance with ASTM D3037-81.

The amount of silica per 100 parts by mass of the rubber component is preferably 1 part by mass or more, more preferably 10 parts by mass or more, still more preferably 30 parts by mass or more, and particularly preferably 50 parts by mass or more. Also, the amount is preferably 150 parts by mass or less, and more preferably 100 parts by mass or less. If the amount is less than 1 part by mass, sufficient fuel efficiency and sufficient abrasion resistance tend not to be obtained. If the amount is more than 150 parts by mass, such silica tends to have poor dispersibility, resulting in poor processability.

The rubber composition of the present invention preferably contains a silane coupling agent together with the silica. The silane coupling agent may be any silane coupling agent conventionally used in combination with silica in the rubber industry. Examples include sulfide silane coupling agents such as bis(3-triethoxysilylpropyl)tetrasulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Preferred among these are sulfide silane coupling agents, with bis(3-triethoxysilylpropyl)tetrasulfide being more preferred.

When a silane coupling agent is contained, the amount of the silane coupling agent per 100 parts by mass of silica is preferably 1 part by mass or more, and more preferably 2 parts by mass or more. The amount is also preferably 20 parts by mass or less, and more preferably 15 parts by mass or less. If the amount is less than 1 part by mass, the effect of improving dispersibility, and the like tend not to be sufficiently produced. If the amount is more than 20 parts by mass, the coupling effects tend not to be sufficiently produced, thereby resulting in reduced reinforcing properties.

The rubber composition of the present invention may optionally contain compounding agents conventionally used in the rubber industry, in addition to the components described above. Examples of the compounding agents include other reinforcing fillers, antioxidants, oils, waxes, vulcanizing agents such as sulfur, and vulcanization accelerators.

The rubber composition of the present invention can be used in, for example, treads (cap treads, base treads) and sidewalls for tires and, in particular, is suitable for treads and especially for cap treads.

The pneumatic tire of the present invention can be manufactured from the above-described rubber composition by conventional methods.

Specifically, the rubber composition containing the components mentioned above, before vulcanization, may be extruded and processed according to the shape of a tire component, such as a tread, and then formed together with other tire components on a tire building machine by a conventional method to build an unvulcanized tire, which is then heated and pressurized in a vulcanizer to provide a tire.

The pneumatic tire of the present invention is suitable for passenger cars, large passenger cars, large SUVs, heavy load vehicles such as trucks and buses, and light trucks, and usable as winter tires and studless winter tires for these cars or vehicles.

EXAMPLES

The present invention will be specifically described by reference to examples; however, the present invention is not limited to these examples.

The chemicals used in production examples are listed below.
Ion-exchanged water: In-house product
Potassium rosinate soap: Product of Harima Chemicals Group, Inc.
Fatty acid sodium soap: Product of Wako Pure Chemical Industries, Ltd.
Potassium chloride: Product of Wako Pure Chemical Industries, Ltd.
Sodium naphthalenesulfonate formalin condensate: Product of Kao Corporation
1,3-Butadiene: 1,3-Butadiene produced by TAKACHIHO TRADING CO., LTD.
Styrene: Styrene (compound represented by formula (2)) produced by Wako Pure Chemical Industries, Ltd. t-Dodecyl mercaptan: tert-Dodecyl mercaptan (chain transfer agent) produced by Wako Pure Chemical Industries, Ltd. Si363: 3-[Ethoxybis(3,6,9,12,15-pentaoxaoctacosane-1-yloxy)silyl]-1-propanethiol (chain transfer agent, compound represented by the formula below, compound represented by formula (3)) produced by Degussa

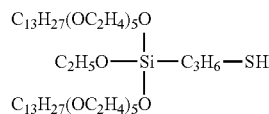

3-Mercaptopropyltriethoxysilane: Product of Tokyo Chemical Industry Co., Ltd. (chain transfer agent, compound represented by formula (3))

2-Ethylhexyl 3-mercaptopropionate: Product of Tokyo Chemical Industry Co., Ltd. (chain transfer agent)
2-Mercaptoethyl octanoate: Product of Tokyo Chemical Industry Co., Ltd. (chain transfer agent)
Sodium hydrosulfide: Product of Wako Pure Chemical Industries, Ltd.
$FeSO_4$: Ferric sulfate produced by Wako Pure Chemical Industries, Ltd.
EDTA: Sodium ethylenediaminetetraacetate produced by Wako Pure Chemical Industries, Ltd.
Rongalite: Sodium formaldehyde sulfoxylate produced by Wako Pure Chemical Industries, Ltd.
Polymerization initiator: PERMENTA H (paramenthane hydroperoxide) produced by NOF CORPORATION
N,N-Diethylhydroxylamine: Product of Wako Pure Chemical Industries, Ltd.
2,6-Di-t-butyl-p-cresol: Sumilizer BHT produced by Sumitomo Chemical Co., Ltd.
Methyl methacrylate: Product of Tokyo Chemical Industry Co., Ltd.
Methyl acrylate: Product of Tokyo Chemical Industry Co., Ltd.
(Preparation of Emulsifier)

An emulsifier was prepared by adding 9356 g of ion-exchanged water, 1152 g of potassium rosinate soap, 331 g of fatty acid sodium soap, 51 g of potassium chloride, and 30 g of sodium naphthalenesulfonate formalin condensate, followed by stirring at 70° C. for 2 hours.

Production Example 1

A 50 L (interior volume) stainless-steel polymerization reactor was cleaned, dried, and purged with dry nitrogen. Then, 1,3-butadiene (3500 g), styrene (1500 g), t-dodecyl mercaptan (5.74 g), the emulsifier (9688 g), sodium hydrosulfide (1.8 M, 6.3 ml), an activator ($FeSO_4$/EDTA/Rongalite, 6.3 ml each), a polymerization initiator (2.3 M, 6.3 ml) were charged into the reactor, followed by stirring at 10° C. for 3 hours to cause polymerization. After completion of the polymerization, N,N-diethylhydroxylamine (2.9 g) was added to the resulting mixture and they were reacted for 30 minutes. The contents were taken out from the polymerization reactor and combined with 2,6-di-t-butyl-p-cresol (10 g). Then most of the water was evaporated and the residue was dried at 55° C. for 12 hours under reduced pressure. In this manner, a copolymer 1 was prepared.

Production Example 2

A copolymer 2 was prepared in the same manner as in Production Example 1, except that 1500 g of methyl methacrylate was used instead of 1500 g of styrene.

Production Example 3

A copolymer 3 was prepared in the same manner as in Production Example 1, except that 1500 g of methyl acrylate was used instead of 1500 g of styrene.

Production Example 4

A copolymer 4 was prepared in the same manner as in Production Example 1, except that 1500 g of methyl methacrylate was used instead of 1500 g of styrene, and 1.48 g of 3-mercaptopropyltriethoxysilane was used instead of 5.74 g of t-dodecyl mercaptan.

Production Example 5

A copolymer 5 was prepared in the same manner as in Production Example 1, except that 1500 g of methyl acrylate was used instead of 1500 g of styrene, and 1.48 g of 3-mercaptopropyltriethoxysilane was used instead of 5.74 g of t-dodecyl mercaptan.

Production Example 6

A copolymer 6 was prepared in the same manner as in Production Example 1, except that 1500 g of methyl methacrylate was used instead of 1500 g of styrene, and 6.11 g of Si363 was used instead of 5.74 g of t-dodecyl mercaptan.

Production Example 7

A copolymer 7 was prepared in the same manner as in Production Example 1, except that 1500 g of methyl acrylate was used instead of 1500 g of styrene, and 6.11 g of Si363 was used instead of 5.74 g of t-dodecyl mercaptan.

Production Example 8

A copolymer 8 was prepared in the same manner as in Production Example 1, except that 750 g of the 1500 g of styrene was replaced with 750 g of methyl methacrylate.

Production Example 9

A copolymer 9 was prepared in the same manner as in Production Example 1, except that 750 g of the 1500 g of styrene was replaced with 750 g of methyl acrylate.

Production Example 10

A copolymer 10 was prepared in the same manner as in Production Example 1, except that 750 g of the 1500 g of styrene was replaced with 750 g of methyl methacrylate, and 6.11 g of Si363 was used instead of 5.74 g of t-dodecyl mercaptan.

Production Example 11

A copolymer 11 was prepared in the same manner as in Production Example 1, except that 750 g of the 1500 g of styrene was replaced with 750 g of methyl acrylate, and 6.11 g of Si363 was used instead of 5.74 g of t-dodecyl mercaptan.

Production Example 12

A copolymer 12 was prepared in the same manner as in Production Example 1, except that 750 g of the 1500 g of styrene was replaced with 750 g of methyl methacrylate, and 1.48 g of 3-mercaptopropyltriethoxysilane was used instead of 5.74 g of t-dodecyl mercaptan.

Production Example 13

A copolymer 13 was prepared in the same manner as in Production Example 1, except that 750 g of the 1500 g of styrene was replaced with 750 g of methyl acrylate, and 1.48 g of 3-mercaptopropyltriethoxysilane was used instead of 5.74 g of t-dodecyl mercaptan.

Production Example 14

A copolymer 14 was prepared in the same manner as in Production Example 1, except that 1500 g of methyl methacrylate was used instead of 1500 g of styrene, and 1.35 g of 2-ethylhexyl 3-mercaptopropionate was used instead of 5.74 g of t-dodecyl mercaptan.

Production Example 15

A copolymer 15 was prepared in the same manner as in Production Example 1, except that 1500 g of methyl acrylate was used instead of 1500 g of styrene, and 1.35 g of 2-ethylhexyl 3-mercaptopropionate was used instead of 5.74 g of t-dodecyl mercaptan.

Production Example 16

A copolymer 16 was prepared in the same manner as in Production Example 1, except that 1500 g of methyl methacrylate was used instead of 1500 g of styrene, and 1.26 g of 2-mercaptoethyl octanoate was used instead of 5.74 g of t-dodecyl mercaptan.

Production Example 17

A copolymer 17 was prepared in the same manner as in Production Example 1, except that 1500 g of methyl acrylate was used instead of 1500 g of styrene, and 1.26 g of 2-mercaptoethyl octanoate was used instead of 5.74 g of t-dodecyl mercaptan.

Production Example 18

A copolymer 18 was prepared in the same manner as in Production Example 1, except that 750 g of the 1500 g of styrene was replaced with 750 g of methyl methacrylate, and 1.35 g of 2-ethylhexyl 3-mercaptopropionate was used instead of 5.74 g of t-dodecyl mercaptan.

Production Example 19

A copolymer 19 was prepared in the same manner as in Production Example 1, except that 750 g of the 1500 g of styrene was replaced with 750 g of methyl acrylate, and 1.35 g of 2-ethylhexyl 3-mercaptopropionate was used instead of 5.74 g of t-dodecyl mercaptan.

Production Example 20

A copolymer 20 was prepared in the same manner as in Production Example 1, except that 750 g of the 1500 g of styrene was replaced with 750 g of methyl methacrylate, and 1.26 g of 2-mercaptoethyl octanoate was used instead of 5.74 g of t-dodecyl mercaptan.

Production Example 21

A copolymer 21 was prepared in the same manner as in Production Example 1, except that 750 g of the 1500 g of styrene was replaced with 750 g of methyl acrylate, and 1.26 g of 2-mercaptoethyl octanoate was used instead of 5.74 g of t-dodecyl mercaptan.

Table 1 shows the results of the copolymers 1 to 21 prepared in Production Examples 1 to 21 in terms of the amount of butadiene (conjugated diene monomer), the amount of methyl methacrylate or methyl acrylate (unsaturated acyclic monoester represented by the formula (1)), the amount of styrene, Mw, Mw/Mn, Tg, and Mooney viscosity. These items were measured as described collectively below.

(Amount of Each Monomer Unit)

A $^1$H-NMR spectrum was measured using a JEOL JNM-A 400 NMR device at 25° C. Based on the spectrum, the ratio of phenyl protons from the styrene unit at 6.5 to 7.2 ppm, the ratio of vinyl protons from the butadiene unit at 4.9 to 5.4 ppm, and the ratio of ester protons from the unit derived from the unsaturated acyclic monoester represented by the formula (1) at 3.6 to 4.6 ppm were determined. Then, the amounts of the monomer units were determined from these ratios.

(Measurement of Weight Average Molecular Weight (Mw) and Number Average Molecular Weight (Mn))

The weight average molecular weight (Mw) and the number average molecular weight (Mn) of the copolymers were determined using a gel permeation chromatograph (GPC) (GPC-8000 series produced by TOSOH Corporation, detector: differential refractometer, column: TSKGEL SUPERMULTIPORE HZ-M produced by TOSOH Corporation) and calibrated with polystyrene standards.

(Measurement of Glass Transition Temperature (Tg))

Glass transition start temperature was measured with a differential scanning calorimeter (Q200) produced by TA Instruments, Japan at a temperature increase rate of 10° C./min in accordance with JIS K 7121, and taken as glass transition temperature (Tg).

(Mooney Viscosity ($ML_{1+4}$, 130° C.))

After preheating at 130° C. for 1 minute, the rubbers were measured for Mooney viscosity ($ML_{1+4}$, 130° C.) for 4 minutes using a Mooney viscometer (SMV-200) produced by SHIMADZU CORPORATION in accordance with JIS-K 6300.

TABLE 1

| | Production Example 1 (Copolymer 1) | Production Example 2 (Copolymer 2) | Production Example 3 (Copolymer 3) | Production Example 4 (Copolymer 4) | Production Example 5 (Copolymer 5) | Production Example 6 (Copolymer 6) | Production Example 7 (Copolymer 7) | Production Example 8 (Copolymer 8) | Production Example 9 (Copolymer 9) | Production Example 10 (Copolymer 10) |
|---|---|---|---|---|---|---|---|---|---|---|
| Amount of butadiene (conjugated diene monomer) (% by mass) | 76 | 76 | 76 | 76 | 76 | 76 | 76 | 76 | 76 | 76 |
| Amount of methyl methacrylate or methyl acrylate (formula (1)) (% by mass) | — | 24 | 24 | 24 | 24 | 24 | 24 | 12 | 12 | 12 |
| Amount of styrene (% by mass) | 24 | — | — | — | — | — | — | 12 | 12 | 12 |
| Weight average molecular weight (Mw) | 510,000 | 490,000 | 480,000 | 510,000 | 520,000 | 500,000 | 510,000 | 480,000 | 480,000 | 490,000 |
| Molecular weight distribution (Mw/Mn) | 3.6 | 4.2 | 4.4 | 3.9 | 4.0 | 4.0 | 4.2 | 3.8 | 3.9 | 3.6 |
| Tg (° C.) | −51 | −52 | −60 | −52 | −60 | −51 | −59 | −48 | −56 | −48 |
| Mooney viscosity ($ML_{1+4}$, 130° C.) | 52 | 52 | 50 | 55 | 53 | 57 | 54 | 60 | 58 | 62 |

| | Production Example 11 (Copolymer 11) | Production Example 12 (Copolymer 12) | Production Example 13 (Copolymer 13) | Production Example 14 (Copolymer 14) | Production Example 15 (Copolymer 15) | Production Example 16 (Copolymer 16) | Production Example 17 (Copolymer 17) | Production Example 18 (Copolymer 18) | Production Example 19 (Copolymer 19) | Production Example 20 (Copolymer 20) | Production Example 21 (Copolymer 21) |
|---|---|---|---|---|---|---|---|---|---|---|---|
| Amount of butadiene (conjugated diene monomer) (% by mass) | 76 | 76 | 76 | 76 | 76 | 76 | 76 | 76 | 76 | 76 | 76 |
| Amount of methyl methacrylate or methyl acrylate (formula (1)) (% by mass) | 12 | 12 | 12 | 24 | 24 | 24 | 24 | 12 | 12 | 12 | 12 |
| Amount of styrene (% by mass) | 12 | 12 | 12 | — | — | — | — | 12 | 12 | 12 | 12 |
| Weight average molecular weight (Mw) | 490,000 | 500,000 | 480,000 | 500,000 | 520,000 | 500,000 | 500,000 | 490,000 | 490,000 | 490,000 | 500,000 |
| Molecular weight distribution (Mw/Mn) | 3.6 | 3.8 | 4.8 | 4.1 | 4.3 | 4.1 | 4.2 | 3.8 | 3.6 | 3.8 | 4.2 |
| Tg (° C.) | −56 | −48 | −60 | −51 | −59 | −51 | −59 | −48 | −58 | −49 | −59 |
| Mooney viscosity ($ML_{1+4}$, 130° C.) | 59 | 61 | 51 | 61 | 52 | 59 | 52 | 60 | 51 | 53 | 62 |

The chemicals used in examples and comparative example were listed below.
Rubber component: Copolymers 1 to 21 prepared in Production Examples 1 to 21 above
Carbon black: SHOBLACK N220 ($N_2SA$: 111 $m^2/g$, DBP: 115 ml/100 g) produced by Cabot Japan K.K.
Silica: ULTRASIL VN3 ($N_2SA$: 175 $m^2/g$) produced by Degussa Silane coupling agent: Si69 (bis(3-triethoxysilylpropyl)tetrasulfide) produced by Degussa
Zinc oxide: Zinc oxide #1 produced by Mitsui Mining and Smelting Co., Ltd.
Stearic acid: Stearic acid produced by NOF CORPORATION Antioxidant: NOCRAC 6C (N-1,3-dimethylbutyl-N'-phenyl-p-phenylenediamine) produced by OUCHI SHINKO CHEMICAL INDUSTRIAL CO., LTD.
Wax: Sunnoc Wax produced by OUCHI SHINKO CHEMICAL INDUSTRIAL CO., LTD.
Vulcanization accelerator 1: Nocceler CZ (N-cyclohexyl-2-benzothiazolylsulfenamide) produced by OUCHI SHINKO CHEMICAL INDUSTRIAL CO., LTD.
Vulcanization accelerator 2: Nocceler D (N,N'-diphenylguanidine) produced by OUCHI SHINKO CHEMICAL INDUSTRIAL CO., LTD.
Sulfur: Powder sulfur produced by Tsurumi Chemical Industry Co., Ltd.

Examples and Comparative Example

According to the formulations shown in Tables 2 and 3, the chemicals other than the sulfur and the vulcanization accelerators were mixed using a Banbury mixer at 150° C. for 5 minutes. To the mixed mass were added the sulfur and the vulcanization accelerators, and they were mixed by an open roll mill at 170° C. for 12 minutes to prepare an unvulcanized rubber composition.

The unvulcanized rubber composition was press vulcanized at 170° C. for 20 minutes to prepare a vulcanized rubber composition.

The thus obtained unvulcanized rubber compositions and vulcanized rubber compositions were evaluated as follows. Tables 2 and 3 show the evaluation results.

(Processability)

The unvulcanized rubber compositions were measured for Mooney viscosity at 100° C. in accordance with JIS K 6300. A lower viscosity indicates better processability.

(Fuel Efficiency)

The tan δ of the vulcanized rubber compositions was measured using a viscoelasticity spectrometer VES produced by Iwamoto Seisakusho Co., Ltd. at a temperature of 60° C., an initial strain of 10%, and a dynamic strain of 2%. A lower tan δ indicates better fuel efficiency.

(Wet Grip Performance)

A viscoelastic parameter was determined for specimens prepared from the vulcanized rubber compositions, using a viscoelastometer (ARES) produced by Rheometric Scientific, Inc. in a torsional mode. The tan δ was measured at 0° C., a frequency of 10 Hz, and a strain of 1%. A higher tan δ indicates better wet grip performance.

(Abrasion Resistance)

Using a Lambourn abrasion tester, the abrasion loss of the vulcanized rubber compositions was measured at room temperature, an applied load of 1.0 kgf, and a slip ratio of 30%, and expressed as an index using the equation below. A higher index indicates better abrasion resistance.

(Abrasion resistance index)=(Abrasion loss of Comparative Example 1)/(Abrasion loss in each formulation)×100

TABLE 2

| | | Comparative Example 1 | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Formulation (part by mass) | Copolymer | Copolymer 1 | Copolymer 2 | Copolymer 3 | Copolymer 4 | Copolymer 5 | Copolymer 6 | Copolymer 7 | Copolymer 8 | Copolymer 9 | Copolymer 10 | Copolymer 11 | Copolymer 12 |
| | | 100 | 100 | 100 | 100 | 100 | 100 | 100 | 100 | 100 | 100 | 100 | 100 |
| | Carbon black | 5 | 5 | 5 | 5 | 5 | 5 | 5 | 5 | 5 | 5 | 5 | 5 |
| | Silica | 75 | 75 | 75 | 75 | 75 | 75 | 75 | 75 | 75 | 75 | 75 | 75 |
| | Silane coupling agent | 6 | 6 | 6 | 6 | 6 | 6 | 6 | 6 | 6 | 6 | 6 | 6 |
| | Zinc oxide | 2 | 2 | 2 | 2 | 2 | 2 | 2 | 2 | 2 | 2 | 2 | 2 |
| | Stearic acid | 2 | 2 | 2 | 2 | 2 | 2 | 2 | 2 | 2 | 2 | 2 | 2 |
| | Antioxidant | 2 | 2 | 2 | 2 | 2 | 2 | 2 | 2 | 2 | 2 | 2 | 2 |
| | Wax | 2 | 2 | 2 | 2 | 2 | 2 | 2 | 2 | 2 | 2 | 2 | 2 |
| | Vulcanization accelerator 1 | 1.5 | 1.5 | 1.5 | 1.5 | 1.5 | 1.5 | 1.5 | 1.5 | 1.5 | 1.5 | 1.5 | 1.5 |
| | Vulcanization accelerator 2 | 2 | 2 | 2 | 2 | 2 | 2 | 2 | 2 | 2 | 2 | 2 | 2 |
| | Sulfur | 1.5 | 1.5 | 1.5 | 1.5 | 1.5 | 1.5 | 1.5 | 1.5 | 1.5 | 1.5 | 1.5 | 1.5 |
| Evaluation | Processability | 61 | 37 | 52 | 53 | 53 | 50 | 55 | 46 | 51 | 55 | 53 | 55 |
| | Fuel efficiency | 0.228 | 0.214 | 0.213 | 0.180 | 0.172 | 0.182 | 0.181 | 0.225 | 0.224 | 0.186 | 0.179 | 0.182 |
| | Wet grip performance | 0.454 | 0.658 | 0.566 | 0.698 | 0.692 | 0.691 | 0.687 | 0.724 | 0.711 | 0.743 | 0.737 | 0.741 |
| | Abrasion resistance | 100 | 128 | 124 | 140 | 138 | 143 | 137 | 135 | 131 | 151 | 154 | 143 |

TABLE 3

| | | Example 12 | Example 13 | Example 14 | Example 15 | Example 16 | Example 17 | Example 18 | Example 19 | Example 20 |
|---|---|---|---|---|---|---|---|---|---|---|
| Formulation (part by mass) | Copolymer | Copolymer 13 100 | Copolymer 14 100 | Copolymer 15 100 | Copolymer 16 100 | Copolymer 17 100 | Copolymer 18 100 | Copolymer 19 100 | Copolymer 20 100 | Copolymer 21 100 |
| | Carbon black | 5 | 5 | 5 | 5 | 5 | 5 | 5 | 5 | 5 |
| | Silica | 75 | 75 | 75 | 75 | 75 | 75 | 75 | 75 | 75 |
| | Silane coupling agent | 6 | 6 | 6 | 6 | 6 | 6 | 6 | 6 | 6 |
| | Zinc oxide | 2 | 2 | 2 | 2 | 2 | 2 | 2 | 2 | 2 |
| | Stearic acid | 2 | 2 | 2 | 2 | 2 | 2 | 2 | 2 | 2 |
| | Antioxidant | 2 | 2 | 2 | 2 | 2 | 2 | 2 | 2 | 2 |
| | Wax | 2 | 2 | 2 | 2 | 2 | 2 | 2 | 2 | 2 |
| | Vulcanization accelerator 1 | 1.5 | 1.5 | 1.5 | 1.5 | 1.5 | 1.5 | 1.5 | 1.5 | 1.5 |
| | Vulcanization accelerator 2 | 2 | 2 | 2 | 2 | 2 | 2 | 2 | 2 | 2 |
| | Sulfur | 1.5 | 1.5 | 1.5 | 1.5 | 1.5 | 1.5 | 1.5 | 1.5 | 1.5 |
| Evaluation | Processability | 57 | 39 | 55 | 40 | 57 | 48 | 54 | 50 | 62 |
| | Fuel efficiency | 0.185 | 0.202 | 0.194 | 0.192 | 0.186 | 0.201 | 0.186 | 0.192 | 0.195 |
| | Wet grip performance | 0.752 | 0.663 | 0.667 | 0.677 | 0.665 | 0.709 | 0.728 | 0.724 | 0.723 |
| | Abrasion resistance | 139 | 139 | 133 | 138 | 129 | 143 | 146 | 141 | 127 |

Tables 2 and 3 demonstrated that, in the examples in which the copolymers 2 to 21, each of which is a copolymer synthesized by copolymerization of a conjugated diene monomer and an unsaturated acyclic monoester represented by the formula (1), were each combined with silica and carbon black, balanced improvements in fuel efficiency, abrasion resistance, and wet grip performance were achieved while good processability was obtained.

The invention claimed is:

1. A pneumatic tire, having a tread manufactured from a rubber composition,
the rubber composition comprising:
a copolymer synthesized by copolymerizing monomers consisting essentially of a conjugated diene monomer and an unsaturated acyclic monoester represented by the formula (1) below, or monomers consisting essentially of a conjugated diene monomer, an unsaturated acyclic monoester represented by the formula (1) below and a compound represented by the formula (2) below; and
at least one of carbon black and silica,

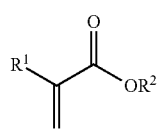

(1)

wherein $R^1$ represents hydrogen or a C1-C30 hydrocarbon group, and $R^2$ represents hydrogen or a C1-C30 hydrocarbon group,

(2)

wherein $R^{21}$ represents hydrogen, a C1-C3 aliphatic hydrocarbon group, a C3-C8 alicyclic hydrocarbon group, or a C6-C10 aromatic hydrocarbon group, and $R^{22}$ represents hydrogen or methyl.

2. The pneumatic tire according to claim 1, wherein the copolymer comprises 5% to 95% by mass of units derived from the conjugated diene monomer and 5% to 95% by mass of units derived from the unsaturated acyclic monoester per 100% by mass of structural units of the copolymer.

3. The pneumatic tire according to claim 1, wherein the copolymer is synthesized by emulsion polymerization, and has a weight average molecular weight within the range of 5,000 to 2,000,000 and a molecular weight distribution within the range of 2.1 to 11.

4. The pneumatic tire according to claim 1, wherein $R^1$ is hydrogen or methyl, and $R^2$ is methyl.

5. The pneumatic tire according to claim 1, wherein the conjugated diene monomer is 1,3-butadiene.

6. The pneumatic tire according to claim 1,
wherein the copolymer comprises 5% to 90% by mass of units derived from the conjugated diene monomer, 5% to 70% by mass of units derived from the unsaturated acyclic monoester, and 1% to 50% by mass of units derived from the compound per 100% by mass of structural units of the copolymer.

7. The pneumatic tire according to claim 1, wherein the copolymer is synthesized using as a chain transfer agent a compound that contains a mercapto group and a functional group having an affinity for filler.

8. The pneumatic tire according to claim 1, wherein the copolymer is synthesized using as a chain transfer agent a compound that contains a mercapto group, and an alkoxysilyl group or an ester group.

* * * * *